United States Patent
Tanaka et al.

(10) Patent No.: US 7,201,978 B2
(45) Date of Patent: Apr. 10, 2007

(54) MAGNETIC RECORDING MEDIUM

(75) Inventors: Hiroyuki Tanaka, Tokyo (JP); Shigeo Kurose, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/996,408

(22) Filed: Nov. 26, 2004

(65) Prior Publication Data

US 2005/0118459 A1    Jun. 2, 2005

(30) Foreign Application Priority Data

Nov. 27, 2003   (JP)   .............................. 2003-397526

(51) Int. Cl.
*G11B 5/66*   (2006.01)

(52) U.S. Cl. ................................. 428/840.5

(58) Field of Classification Search .............. 428/840.5
See application file for complete search history.

(56) References Cited

U.S. PATENT DOCUMENTS 4,521,486 A * 6/1985 Ninomiya et al. .......... 428/407

6,759,119 B2 * 7/2004 Murayama et al. ...... 428/840.5

FOREIGN PATENT DOCUMENTS

| JP | 9-22524 | 1/1997 |
|---|---|---|
| JP | 2002-25036 | 1/2002 |

* cited by examiner

*Primary Examiner*—Holly Rickman
(74) *Attorney, Agent, or Firm*—Oblon, Spivak, McClelland, Maier & Neustadt, P.C.

(57) ABSTRACT

A magnetic recording medium contains a non-magnetic substrate, a non-magnetic layer arranged on or above one side of the non-magnetic substrate and containing a non-magnetic powder, a carbon black and a binder resin, and a magnetic layer being arranged on or above the non-magnetic layer and containing a ferromagnetic powder and a binder resin, in which the binder resin of the non-magnetic layer contains an electron-beam-curable resin having an adsorption with respect to the non-magnetic powder of less than 2.2 mg per square meter in terms of a specific surface area determined according to a BET method. The magnetic recording medium can carry out high-density recording and exhibits improved electromagnetic conversion properties and a reduced error rate.

10 Claims, No Drawings

MAGNETIC RECORDING MEDIUM

BACKGROUND OF THE INVENTION

1. Field of the Invention

The present invention relates to a magnetic recording medium, particularly to a magnetic recording medium each having a magnetic layer with a smooth surface, being capable of carrying out electromagnetic conversion further satisfactorily and exhibiting a reduced error rate.

2. Description of the Related Art

Magnetic recording medium typically for use in audiovisual apparatuses and computers have become more and more denser in their recording density. Such magnetic recording medium must have a reduced minimal recording unit. For this reason, a recording wavelength is shortened, and the recording track width and the thickness of recording medium are reduced. For adapting these requirements, fine powders of ferromagnetic metals each having large magnetic energy have been used in the magnetic recording medium.

With an increasing recording density of such a magnetic recording medium, the magnetic layer of the magnetic recording medium must have a further reduced thickness and a further smoothened surface. Most of magnetic recording medium exhibiting a high recording density each have a multilayer structure and comprise a non-magnetic substrate, a non-magnetic layer and a magnetic layer. The non-magnetic layer is arranged on or above one side of the non-magnetic substrate and contains a non-magnetic powder, a carbon black and a binder resin. The magnetic layer is arranged on or above the non-magnetic layer and contains a ferromagnetic metal powder and a binder resin. The upper magnetic layer of the magnetic recording medium becomes thinner and thinner, and the surface smoothness of the magnetic layer is thus largely affected by the surface smoothness of the lower non-magnetic layer.

Attempts have been made to smoothen a surface of the non-magnetic layer by highly dispersing a non-magnetic powder in the non-magnetic layer to improve the surface smoothness of the magnetic layer. Japanese Unexamined Patent Application Publication No. 2002-25036, for example, discloses a magnetic recording medium prepared by applying coating compositions comprising a ferromagnetic powder and a non-magnetic powder dispersed in a binder, respectively. In this magnetic recording medium, the coating composition containing the dispersed non-magnetic powder is prepared by dispersing the non-magnetic powder in a first binder component having a high adsorption of 2.2 mg/m$^2$, and further dispersing the dispersion with a second binder component satisfying specific conditions.

A single use of such a highly adsorptive thermosetting binder resin as described in the above-mentioned publication, however, increases the viscosity of the coating composition, and the resulting non-magnetic layer still has an insufficient surface smoothness, although it is satisfactory in other properties.

SUMMARY OF THE INVENTION

Accordingly, it is an object of the present invention to provide a magnetic recording medium achieving a high recording density, being capable of carrying out electromagnetic conversion further satisfactorily and exhibiting a reduced error rate, by sufficiently dispersing a non-magnetic powder in the non-magnetic layer to thereby realize good surface smoothness without deteriorating properties of the non-magnetic layer.

To achieve the above objects, the present invention provides magnetic recording medium including a non-magnetic substrate, a non-magnetic layer being arranged on or above one side of the non-magnetic substrate and containing a non-magnetic powder, a carbon black and a binder resin, and a magnetic layer being arranged on or above the non-magnetic layer and containing a ferromagnetic powder and a binder resin, in which the binder resin of the non-magnetic layer comprises an electron-beam-curable resin having an adsorption with respect to the non-magnetic powder of less than 2.2 mg per square meter in terms of a specific surface area determined according to a Brunauer-Emmett-Teller method (BET method). The phrase "in terms of specific surface area determined according to the BET method" used herein means an adsorption per unit area [(resin (mg))/(non-magnetic powder (m$^2$))] determined by dividing the adsorption per unit weight with respect to the non-magnetic powder [(resin (mg))/(non-magnetic powder (mg))] by the surface area per unit weight (specific surface area) of the non-magnetic powder determined by the BET method [(non-magnetic powder (m$^2$))/(non-magnetic powder (mg))].

The electron-beam-curable resin is preferably a vinyl chloride resin having a functional group sensitive to electron beams. The non-magnetic powder preferably has a pH of 7 or below.

According to the present invention, the non-magnetic powder is dispersed more satisfactorily, and the non-magnetic layer has a more smooth surface, which achieves a more smooth surface of the magnetic layer. This is achieved by using an electron-beam-curable resin as the binder resin in the non-magnetic layer and configuring the electron-beam-curable resin to have a low adsorption of less than 2.2 mg per square meter in terms of a specific surface area determined according to the BET method. The resulting magnetic recording medium achieves a high recording density, can carry out electromagnetic conversion more satisfactorily and exhibits a reduced error rate.

DESCRIPTION OF THE PREFERRED EMBODIMENTS

The embodiment of the invention will be described in detail hereinafter.

The magnetic recording medium of the present invention having a multilayer structure including a non-magnetic layer and a magnetic layer comprises an electron-beam-curable resin as a binder resin in the non-magnetic layer. Examples of conventional binder resins for such non-magnetic layers are thermosetting resins as described in the above-mentioned patent document, as well as thermoplastic resins, electron-beam-curable resins and mixtures of these resins. According to the present invention, an electron-beam-curable resin is used as the binder resin in the non-magnetic layer for achieving a desired surface smoothness without deteriorating the properties of the non-magnetic layer. The reasons for this will be described below.

Preparation methods for the multilayer structure of the non-magnetic layer and the magnetic layer are classified as two methods. In a first method, a coating composition for non-magnetic layer is applied onto a non-magnetic substrate, and subsequently a coating composition for magnetic layer is applied onto the coating composition for non-magnetic layer before the coating composition for non-magnetic layer is dried. In a second method, a film of a coating composition for non-magnetic layer is applied onto a non-magnetic substrate, the film is dried, is subjected to calendering and curing, and then a coating composition for magnetic layer is applied onto the cured film of the coating composition for non-magnetic layer. When compared between the two methods, the second method is superior in the flatness (smoothness) and uniformity of the interface between the non-magnetic layer and the magnetic layer. The interface between the non-magnetic layer and the magnetic layer prepared according to the first method may become nonuniform, which may invite power variation.

When the multilayer structure of the non-magnetic layer and the magnetic layer is formed according to the second method, the binder resin in the non-magnetic layer must undergo crosslinking and be cured to some extent before the application of the coating composition for magnetic layer. Otherwise, a solvent in the coating composition for magnetic layer permeates the uncured non-magnetic layer and the non-magnetic layer swells, thus inviting a deformed surface of the non-magnetic layer. A roll of the non-magnetic substrate coated with the non-magnetic layer comprising a conventionally used thermoplastic resin or thermosetting resin must be cured in an oven for a long time (e.g., at 70° C. for 2 to 48 hours) for achieving sufficient properties of the resulting non-magnetic layer. However, this process may be troublesome, and invite deformation of the non-magnetic layer and decreased smoothness of the surface of the non-magnetic layer caused by winding. Thus, the binder resin which is usable in the second method is therefore limited to an electron-beam-curable resin.

Specifically, to avoid above-mentioned problems, the non-magnetic layer is prepared by applying a film of the coating composition for non-magnetic layer containing an electron-beam-curable resin as the binder resin to a non-magnetic substrate, drying the coated film, if necessary, subjecting the layer to calendering, applying electron beams to the non-magnetic layer to thereby form three-dimensional crosslinks by the action of the electron beam, and applying a coating composition for magnetic layer onto the cured non-magnetic layer. According to this method, the non-magnetic layer has a three-dimensional crosslinked structure at the time when the coating composition for magnetic layer is applied and is free from swelling caused by an organic solvent in the coating composition for magnetic layer. Thus, the coating composition for magnetic layer can be applied onto the non-magnetic layer as intact without delay. The magnetic recording medium can be prepared by such a method including continuous and simplified processes.

Preferred examples of the electron-beam-curable resin for use in the present invention are resins each of which has a functional group sensitive to electron beams, contain at least one unsaturated double bond in the molecular chain, is capable of forming radicals upon the irradiation of the electron beam and is cured by the action of crosslinking or polymerization. The resin containing such a functional group sensitive to electron beams can be a thermoplastic resin which has been modified so as to become electron beam sensitive by introducing (meth)acrylic double bond according to a conventional procedure. Examples of the base thermoplastic resin are vinyl chloride resins, polyurethane resins, (meth)acrylic resins, polyester resins, acrylonitrile-butadiene copolymers, poly(vinyl butyral)s, nitrocellulose, styrene-butadiene copolymers, poly(vinyl alcohol) resins, acetal resins, epoxy resins, phenoxy resins, polyether resins, polyfunctional polyethers such as polycaprolactones, polyamides, polyimides, phenyl resins, polybutadiene elastomers, chlorinated rubbers, acrylic rubbers, isoprene rubbers and epoxy-modified rubbers.

Among them, preferred is an electron-beam-curable resin prepared by modifying a vinyl chloride resin or polyurethane ethane resin as a base resin with a compound having an isocyanate group and a radical-polymerizable unsaturated double bond in one molecule (hereinafter referred to as "compound for modification") at a specific moisture content. The base vinyl chloride resin or urethane resin can be any of conventionally available resins or newly prepared resins, but should essentially have an intramolecular active hydrogen radical such as a hydroxyl group, primary amine or secondary amine for proceeding the reaction.

The base vinyl chloride resin includes, but is not limited to, commercially available products under the trade names of MR 110, MR 104, MR 112 and MR 113 from Zeon Corporation; and Solbine A, Solbine TAO and Solbine MK 6 from Nisshin Chemical Industry Co., Ltd. The polyurethane resin includes, but is not limited to, commercially available products under the trade names of ESTANE 5778P and ESTANE 5799 from the B.F. Goodrich Company; UR 8700 and UR 8300 from Toyobo Co., Ltd.; and N-3167, N-3301 and TK 501K from Nippon Polyurethane Industry Co., Ltd.

The compound for modification preferably contains the radical-polymerizable unsaturated double bond typically in (meth)acrylic group, vinyl group or mercapto group, and typically preferably contains the radical-polymerizable unsaturated double bond in (meth)acrylic group. Examples of the preferred compound for modification are adducts such as a reaction product (DI-HA adduct) between a diisocyanate (DI) and a hydroxyacrylate compound (HA); and a reaction product (IN-HA adduct) between an isocyanurate (IN) and a hydroxyacrylate compound (HA). The isocyanurate is a trimer derived from diisocyanate. The term "(meth)acrylic group" used herein is a generic term indicating acrylic group and methacrylic group.

The diisocyanate (DI) for use as a raw material for the adduct includes, but is not limited to, isophorone diisocyanate (IPID), 2,4-toluene diisocyanate (2,4-TDI), 2,6-toluene diisocyanate (2,6-TDI), 1,4-xylene diisocyanate, hexamethylene diisocyanate and p-phenylene diisocyanate.

The hydroxyacrylate compound (HA) for use as another raw material for the adduct includes, but is not limited to, 2-hydroxyethyl acrylate (HEA), 2-hydroxyethyl methacrylate (HEMA), 2-hydroxypropyl acrylate (HPA), hydroxydiethylene glycol methacrylate, butoxyhydroxypropyl acrylate, phenoxyhydroxypropyl acrylate, hydroxypropyl dimethacrylate, glycidol dimethacrylate, glycerol dimethacrylate and monohydroxypentaerythritol triacrylate.

By reacting the active hydrogen of the vinyl chloride resin or polyurethane resin with the compound for modification such as an adduct, the resin is modified to have sensitivity to electron beams. The reaction is carried out in an organic solvent such as methyl ethyl ketone (MEK) or toluene. The reaction is preferably carried out by the catalysis of a urethanization catalyst such as dibutyltin dilaurate or tin octylate in an amount of 0.005 to 0.1 part by weight to 100 part by weight of the total amount of the reaction components.

The moisture content of the reaction system upon reaction is controlled at preferably 0.06 to 0.5 percent by weight and more preferably 0.1 to 0.2 percent by weight to the total weight of the resin. This satisfactorily yields a highly cross-linkable electron-beam-curable resin having an adsorption with respect to the non-magnetic powder of less than 2.2 mg per square meter. The reasons for this advantage are as follows. When reacted with such an appropriate amount of water, the adduct yields a polyfunctional acrylic monomer in the reaction system. The non-magnetic powder adsorbs the acrylic monomer precedently to the electron-beam-curable resin, which reduces the adsorption of the electron-beam-curable resin. In addition, the acrylic monomer plays a role as a crosslinking accelerator to thereby form a non-magnetic layer having satisfactory properties. If the moisture content in the reaction mixture is less than 0.06 percent by weight, the acrylic monomer does not effectively play a role as a crosslinking accelerator and the resulting electron-beam-curable resin may not significantly have an adsorption with respect to the non-magnetic powder of less than 2.2 mg per square meter. If it exceeds 0.5 percent by weight, no further improvement in crosslinking properties is expected. In contrast, an excessively large amount of the monomer component (acrylic monomer) may decrease the dispersibility of the non-magnetic powder in the non-magnetic layer. The temperature in this reaction stands preferably at 30° C. to 80° C. and more preferably at 50° C. to 70° C.

The adsorption of the electron-beam-curable resin with respect to the non-magnetic powder in the non-magnetic layer according to the present invention is less than 2.2 mg per square meter, preferably 1.9 mg per square meter or less and more preferably 1.6 mg per square meter or less in terms of specific surface area determined according to the BET method. This improves the dispersion of the non-magnetic powder and achieves a highly smooth surface of the non-magnetic layer, which in turn achieves a highly smooth surface of the magnetic layer. This is probably because the amount of the electron-beam-curable resin adsorbed by the surface of the non-magnetic powder is decreased, and the electron-beam-curable resin disperses into the solvent without aggregation. The resulting magnetic recording medium exhibits a high recording density, can carry out electromagnetic conversion more satisfactorily and exhibits a reduced error rate.

The electron-beam-curable resin preferably and advantageously occupies 50 percent by weight or more of the total binder resin in the non-magnetic layer. The electron-beam-curable resin is specifically preferably a vinyl chloride resin.

The non-magnetic powder can be any of inorganic powders such as needle non-magnetic iron oxide ($\alpha$-$Fe_2O_3$), as well as powders of calcium carbonate ($CaCO_3$), titanium dioxide ($TiO_2$), barium sulfate ($BaSO_4$) and $\alpha$-alumina ($\alpha$-$Al_2O_3$). The non-magnetic powder preferably has a pH of 7 or below. This satisfactorily reduces the adsorption of the electron-beam-curable resin with respect to the non-magnetic powder less than 2.2 mg per square meter.

The carbon black for use in the non-magnetic layer according to the present invention includes, for example, furnace black for rubber, thermal black for rubber, carbon black for colorant, and acetylene black. The carbon black preferably has a BET specific surface area of 5 to 600 $m^2/g$, a DBP oil absorbance of 30 to 400 ml/100-g and an average particle diameter of 10 to 100 nm. The carbon black for use in the present invention can be chosen from, for example, those described in "Carbon Black Handbook" (edited by the Carbon Black Association of Japan).

The weight ratio of the non-magnetic powder to the carbon black in the non-magnetic layer is preferably from 90:10 to 10:90. If the weight ratio exceeds 90:10, the resulting non-magnetic layer may not have a suitable surface electric resistance. In contrast, if it is less than 10:90, the non-magnetic layer may not have a sufficient strength.

The organic solvent for use in the coating composition for non-magnetic layer includes, but is not limited to, a ketone solvent such as methyl ethyl ketone (MEK), methyl isobutyl ketone or cyclohexanone, or an aromatic solvent such as toluene. Each of these organic solvents can be used alone or in combination. The amount of the organic solvent is, for example, from about 100 to about 900 parts by weight, to 100 parts by weight of the total of the binder resin and the solid contents such as the carbon black and the inorganic powder.

If desired, the non-magnetic layer according invention may further comprise any additives such as lubricants, surfactants and other dispersing agents.

The exposed dose of the electron beam to the non-magnetic layer is indicated by the absorbed dose of the non-magnetic layer. The non-magnetic layer is more rapidly cured with an increasing dose. The exposed dose is preferably 1 to 15 Mrad, more preferably 3 to 10 Mrad and further preferably 4 to 7 Mrad. An excessively low dose may not sufficiently cure the non-magnetic layer, and the resulting non-magnetic layer may be permeated by the solvent in the coating composition for magnetic layer. An excessively high dose may destroy the resin structure and the non-magnetic substrate, thus inviting decreased reliability. The irradiation energy (acceleration voltage) is preferably set at 100 kV or more.

The thickness of the non-magnetic layer is preferably 2.5 μm or less, more preferably from 0.1 to 2.3 μm, and further preferably from 0.2 to 2.1 μm. If the thickness exceeds 2.5 μm, no further improvement in performance is expected, but the non-magnetic layer may have an ununiform thickness, require severe coating conditions and have a decreased surface smoothness.

The non-magnetic substrate for use in the present invention can be any of suitable single- or multi-layer resin films such as polyester, polyamide films and aromatic polyamide films. The thickness of the non-magnetic substrate is not specifically limited and can be set within an appropriate range.

The materials for magnetic layer for use in the present invention can be any suitable materials used for magnetic recording medium for high-density recording. The ferromagnetic powder may be a needle ferromagnetic metal powder having an average length of the major axis of preferably 0.15 μm or less, and more preferably from 0.03 to 0.10 μm. If the average length of the major axis exceeds 0.15 μm, the resulting magnetic recording medium may not have satisfactory electromagnetic conversion properties typified by S/N ratio and C/N ratio. A powder of hexagonal iron oxide such as barium ferrite can also be used. The powder of hexagonal iron oxide preferably has a diameter-to-thickness ratio (aspect ratio) of 2 to 7, and preferably has an average primary diameter of 10 to 50 nm as determined by transmission electron microscopic observation. If the average primary diameter exceeds 50 nm, the surface smoothness of the magnetic layer may be deteriorated.

The content of the ferromagnetic powder in the magnetic layer is preferably from about 70 to about 90 percent by weight. An excessively large content of the ferromagnetic powder decreases the relative content of the binder resin, which may deteriorate the surface smoothness of the magnetic layer after calendering. In contrast, the magnetic layer containing an excessively small amount of the ferromagnetic powder may have insufficient regenerated output.

The binder resin for use in the magnetic layer is not specifically limited and includes, for example, the above-mentioned electron-beam-curable resins for use in the nonmagnetic layer, as well as conventional thermoplastic resins, thermosetting resins, other electron-beam-curable resins and mixtures of these resins.

The amount of the binder resin in the magnetic layer is preferably 5 to 40 parts by weight, and more preferably 10 to 30 parts by weight to 100 parts by weight of the ferromagnetic powder. The magnetic layer containing an excessively small amount of the binder resin may have deteriorated strength and exhibit deteriorated durability in operation. The magnetic layer containing an excessively large amount of the binder resin may exhibit deteriorated electromagnetic conversion properties, since the relative amount of the ferromagnetic powder decreases.

When a thermosetting resin is used as the binder resin, any of known polyisocyanates can be used as a crosslinking agent for curing the binder resin. The amount of the crosslinking agent herein is preferably 10 to 30 parts by weight to 100 parts by weight of the binder resin. The magnetic layer may further comprise any of additives such as abrasives, surfactants and other dispersing agents, and higher fatty acids according to necessity.

The coating composition for magnetic layer is prepared by adding an organic solvent to the above-mentioned components. The organic solvent for use herein is not specifically limited and can be chosen from among similar organic solvents for the coating composition for non-magnetic layer. The amount of the organic solvent may be set at about 100 to about 2000 parts by weight, to 100 parts by weight of the total weight of the binder resin and solid contents such as ferromagnetic powder and inorganic particles.

The thickness of the magnetic layer is 3.0 µm or less, preferably from 0.01 to 0.50 µm, and more preferably from 0.02 to 0.30 µm. An excessively thick magnetic layer may invite increased self demagnetization loss and thickness loss.

Where necessary, the magnetic recording medium may further have a back coating layer on a side of the nonmagnetic substrate opposite to the nonmagnetic layer and the magnetic layer. The back coating layer serves to improve the stability during traveling of the medium and inhibit the electrification of the magnetic layer. The back coating layer preferably comprises 30 to 80 percent by weight of a carbon black. The carbon black for use herein can be chosen from any general carbon blacks such as those for use in the non-magnetic layer. In addition to the carbon black, the back coating layer may further comprise any of additives according to necessity. Examples of such additives are non-magnetic inorganic powders such as abrasives for use in the magnetic layer, surfactants and other dispersing agents, higher fatty acids, fatty acid esters, silicone oils and other lubricants.

The thickness of the back coating layer after calendering is, for example, from 0.1 to 1.5 µm, and preferably from 0.2 to 0.8 µm. If the thickness exceeds 1.5 µm, the resulting magnetic recording medium may not travel stably, since the friction with a path which is slidably in contact with the magnetic recording medium excessively increases. In contrast, if it is less than 0.1 µm, the back coating layer may break during traveling of the magnetic recording medium.

The present invention will be illustrated in further detail with reference to several examples below, which are not intended to limit the scope of the invention. All parts and percentages are by weight.

PREPARATION EXAMPLE 1

Resin 1

In a 1-liter three-neck flask were placed 424 parts of isophorone diisocyanate (IPDI), 0.4 part of dibutyltin dilaurate and 0.24 part of 2,6-tert-butyl-4-methylphenyl (BHT), followed by dropwise addition of 372 parts of 2-hydroxypropyl acrylate (HPA) while controlling the temperature at 60° C. After the completion of addition, the mixture was stirred at 60° C. for 2 hours, to yield an IPDI-HPA adduct.

A total of 630 parts of a vinyl chloride resin MR110 (average degree of polymerization:300) available from Zeon Corporation was dissolved in 2291 parts of methyl ethyl ketone (MEK). The moisture content of the resulting solution was measured and was found to be 0.03%. After adjusting the moisture content to 0.1%, 2.45 parts of dibutyltin dilaurate and 0.09 part of 2,6-tert-butyl-4-methylphenyl (BHT) were added to the solution, followed by stirring at 70° C. for 3 hours. Then, 352 parts of the above-prepared IPDI-HPA adduct was added thereto, followed by stirring at 70° C. for 15 hours. After confirming in an IR spectrum that the characteristic absorption of isocyanate group (2270 $cm^{-1}$) disappeared, the product was taken out from the flask to yield Resin 1.

PREPARATION EXAMPLE 2

Resin 2

Resin 2 was prepared by the procedure of Preparation Example 1, except for adjusting the moisture content to 0.2%.

PREPARATION EXAMPLE 3

Resin 3

Resin 3 was prepared by the procedure of Preparation Example 1, except for using MR 104(average degree of polymerization:260) available from Zeon Corporation as the vinyl chloride resin.

PREPARATION EXAMPLE 4

Resin 4

Resin 4 was prepared by the procedure of Preparation Example 1, except for using MR 104 (average degree of polymerization:260) available from Zeon Corporation as the vinyl chloride resin and adjusting the moisture content to 0.2%.

PREPARATION EXAMPLE 5

Resin 5

Resin 5 was obtained by the procedure of Preparation Example 1, except for adjusting the moisture content to 0%.

PREPARATION EXAMPLE 6

Resin 6

Resin 6 was obtained by the procedure of Preparation Example 1, except for adjusting the moisture content to 0.05%.

PREPARATION EXAMPLE 7

Resin 7

In a 3-liter three-neck flask were placed 500 parts of a vinyl chloride resin MR110(average degree of polymerization:300) available from Zeon Corporation, 1250 parts of methyl ethyl ketone (MEK), 0.5 part of dibutyltin dilaurate and 0.3 part of hydroquinone, followed by stirring at 70° C. for 3 hours. Next, 25 parts of 2-isocyanatoethyl methacrylate (IEM) was added to the mixture, followed by stirring at 70° C. for 15 hours. After confirming in an IR spectrum that the characteristic absorption of isocyanate group (2270 cm$^{-1}$) disappeared, the product was taken out from the flask to yield Resin 7.

EXAMPLE 1

| Preparation of Coating Composition for Magnetic Layer | |
|---|---|
| Ferromagnetic powder<br>Needle magnetic Fe-based powder<br>Fe:Co:Al:Y = 100:10:10:2 (by atomic ratio)<br>Coercive force (Hc): 167 kA/m (2100 Oe)<br>Saturation magnetization (σs): 130 Am$^2$/kg<br>BET specific surface area: 58 m$^2$/g<br>Length of major axis: 75 nm<br>Resin | 100 parts |
| Vinyl chloride resin<br>MR110 (vinyl chloride copolymer available from<br>Zeon Corporation) | 10 parts |
| Polyester-polyurethane resin<br>UR8700 (polyester polyurethane available from<br>Toyobo Co., Ltd.) | 7 parts |
| Abrasive<br>HIT60A (α-alumina available from Sumitomo<br>Chemical Co., Ltd.)<br>Average particle diameter: 0.18 μm) | 10 parts |
| Dispersing agent<br>RE610 (phosphatic ester, available from Toho<br>Chemical Industry Co., Ltd.)<br>NV (nonvolatile content = solid content): 30 percent<br>by weight<br>Solvent; MEK:toluene:cyclohexanone = 2:2:1 (by<br>weight) | 1 part |

The above-mentioned components were kneaded in a kneader and preliminarily dispersed in a horizontal pin mill filled with 80% of zirconia beads having a diameter of 0.8 mm. The dispersed mixture was diluted to an NV (nonvolatile content=solid content) of 12 percent by weight and a solvent ratio of MEK:toluene:cyclohexan of 2:2:6 (by weight) and was further subjected to finishing dispersion and thereby yielded a coating composition. The coating composition was mixed with 3 parts of a curing agent (Collonate L, available from Nippon Polyurethane Industry Co., Ltd.), was filtrated through a filter having an absolute filtration accuracy of 0.5 μm and thereby yielded a target coating composition for magnetic layer.

| Preparation of Coating Composition for Non-magnetic Layer | |
|---|---|
| Nonmagnetic powder<br>Needle α-Fe$_2$O$_3$<br>BET specific surface area: 57 m$^2$/g<br>pH: 5.7<br>Average length of major axis: 110 nm | 85 parts |
| Carbon black<br>#950B (available from Mitsubishi Chemical<br>Corporation)<br>Average particle diameter: 16 nm<br>BET specific surface area: 260 m$^2$/g<br>DBP oil absorption: 74 ml/100-g<br>pH: 8<br>Resin | 15 parts |
| Electron beam-curable vinyl chloride resin:<br>Resin 1 | 14 parts |
| Electron beam-curable polyester-polyurethane<br>resin (available from Toyobo Co., Ltd.)<br>Number-average molecular weight: 20000<br>Glass transition temperature Tg: 10° C.<br>Acrylic group content: 6 groups per molecule | 8 parts |
| Abrasive<br>HIT60A (α-alumina available from Sumitomo<br>Chemical Co., Ltd.)<br>Average particle diameter: 0.18 μm)<br>NV (nonvolatile content = solid content): 30% by<br>weight<br>Solvent: MEK:toluene:cyclohexanone = 2:2:1 (by<br>weight) | 5 parts |

The above-mentioned components were kneaded in a pressure kneader and was preliminary dispersed in a horizontal pin mill filled with 80% of zirconia beads having a diameter of 0.8 mm. The dispersion was mixed with 0.5 part of stearic acid, 0.5 part of myristic acid and 0.5 part of butyl stearate each as a lubricant and was diluted to an NV (nonvolatile content=solid content) of 28 percent by weight and a solvent ratio of MEK:toluene:cyclohexan of 2:2:1 (by weight) and was further dispersed. The resulting substance was filtrated through a filter having an absolute filtration accuracy of 0.5 μm and thereby yielded a coating composition for non-magnetic layer.

| Preparation of Coating Composition for Back Coating Layer | |
|---|---|
| Carbon black<br>BP-800 (available from Cabot Corporation GA)<br>Average particle diameter: 17 nm<br>DBP oil absorption: 68 ml/100-g<br>BET specific surface area: 210 m$^2$/g | 75 parts |
| Carbon black<br>BP-130 (available from Cabot Corporation GA)<br>Average particle diameter: 75 nm<br>DBP oil absorption: 69 ml/100-g<br>BET specific surface area: 25 m$^2$/g | 10 parts |
| Calcium carbonate<br>Hakuenka O (available from Shiraishi Kogyo K.K.)<br>Average particle diameter: 30 nm | 15 parts |
| Nitrocellulose<br>BTH1/2 (available from Asahi Chemical Industry<br>Co., Ltd.) | 65 parts |
| Polyurethane resin<br>Aliphatic polyester diol:aromatic polyester<br>diol = 43:53<br>NV (nonvolatile content = solid content): 30% by<br>weight<br>Solvent; MEK:toluene:cyclohexanone = 1:1:1 (by<br>weight) | 35 parts |

The above-mentioned components were kneaded in a kneader and dispersed in a horizontal pin mill filled with 80% of zirconia beads having a diameter of 0.8 mm. The dispersed mixture was diluted with solvents to a nonvolatile content (solid content) of 10 percent by weight and a solvent ratio of MEK:toluene:cyclohexan of 5:4:1 (by weight) and was further dispersed.

The dispersed mixture was mixed with 5 parts of a curing agent (Collonate L, available from Nippon Polyurethane Industry Co., Ltd.), was filtrated through a filter having an absolute filtration accuracy of 0.5 μm and thereby yielded a coating composition for back coating layer.

Samples of magnetic recording medium were prepared in the following manner by using the resulting coating compositions for non-magnetic layer, magnetic layer and back coating layer.

Application Process of Coating Composition for Non-magnetic Layer

The coating composition for non-magnetic layer was applied to a poly(ethylene terephthalate) substrate 6.2 μm thick to a thickness after calendering of 2.0 μm using a nozzle. After drying, the applied layer was subjected to calendering using a plastic roll and a metal roll (number of nip: 4; calendering temperature: 100° C.; linear pressure: 3500 N/cm; calendering speed: 150 m/min) and was irradiated with an electron beam at a dose of 4.5 Mrad.

After irradiating with the electron beam, the web was subjected to a running on a cooling roll to cool the web at a temperature of 17–20° C., and then the cooled web wound up. The wound web had a orderly roll-like shap.

Application Process of Coating Composition for Magnetic Layer and Coating Composition for Back Coating Layer The coating composition for magnetic layer was applied onto the above-prepared non-magnetic layer to a thickness after calendering of 0.1 μm using a nozzle. The applied layer was oriented and dried, followed by calendering using a plastic roll and a metal roll (number of nip: 4; calendering temperature: 100° C.; linear pressure: 3500 N/cm; calendering speed: 150 m/min). The coating composition for back coating layer was then applied to an opposite side of the substrate to the magnetic layer to a thickness of 0.6 μm using a nozzle and was dried, followed by calendering using a plastic roll and a metal roll (number of nip; 4; calendering temperature: 80° C.; linear pressure: 3500 N/cm; calendering speed: 150 m/min).

The above-prepared material magnetic recording medium tape was cured in a heating oven at 60° C. for 24 hours, was cut into a half-inch width and thereby yielded a magnetic tape. The magnetic tape was wound into a LTO Ultrium cartridge and thereby yielded a sample magnetic recording tape.

EXAMPLE 2

A sample magnetic recording tape was prepared by the procedure of Example 1, except for using Resin 2 as the vinyl chloride resin in the coating composition for non-magnetic layer.

EXAMPLE 3

A sample magnetic recording tape was prepared by the procedure of Example 1, except for using Resin 2 as the vinyl chloride resin and needle α-$Fe_2O_3$ (BET specific surface area: 71 $m^2$/g, pH: 6.3, average length of major axis: 110 nm) as the non-magnetic powder in the coating composition for non-magnetic layer.

EXAMPLE 4

A sample magnetic recording tape was prepared by the procedure of Example 1, except for using Resin 3 as the vinyl chloride resin in the coating composition for non-magnetic layer.

EXAMPLE 5

A sample magnetic recording tape was prepared by the procedure of Example 1, except for using Resin 4 as the vinyl chloride resin in the coating composition for non-magnetic layer.

EXAMPLE 6

A sample magnetic recording tape was prepared by the procedure of Example 1, except for using Resin 4 as the vinyl chloride resin and needle α-$Fe_2O_3$ (BET specific surface area: 71 $m^2$/g, pH: 6.3, average length of major axis: 110 nm) as the non-magnetic powder in the coating composition for non-magnetic layer.

EXAMPLE 7

A sample magnetic recording tape was prepared by the procedure of Example 1, except for using Resin 7 as the vinyl chloride resin and needle α-$Fe_2O_3$ (BET specific surface area: 71 $m^2$/g, pH: 6.3, average length of major axis: 110 nm) as the non-magnetic powder in the coating composition for non-magnetic layer.

COMPARATIVE EXAMPLE 1

A sample magnetic recording tape was prepared by the procedure of Example 1, except for using Resin 5 as the vinyl chloride resin in the coating composition for non-magnetic layer.

COMPARATIVE EXAMPLE 2

A sample magnetic recording tape was prepared by the procedure of Example 1, except for using Resin 6 as the vinyl chloride resin in the coating composition for non-magnetic layer.

COMPARATIVE EXAMPLE 3

A sample magnetic recording tape was prepared by the procedure of Example 1, except for using Resin 7, acrylic-modified vinyl chloride resin, as the vinyl chloride resin in the coating composition for non-magnetic layer.

COMPARATIVE EXAMPLE 4

A sample magnetic recording tape was prepared by the procedure of Example 1, except for using a thermosetting binder resin MR 112(average degree of polymerization: 330) available from Zeon Corporation, as the vinyl chloride resin in the coating composition for non-magnetic layer.

Test Methods

<Adsorption of Resin>

The adsorption of each of the binder resins used in the coating compositions for non-magnetic layer with respect to hematite (needle α-Fe$_2$O$_3$), a non-magnetic powder, was determined in the following manner. A mixture of 1 g of hematite particles and 20 g of a 1% solution of a sample binder resin in a solvent mixture containing 40% of MEK, 40% of toluene and 20% of cyclohexanone was subjected to ultrasonic dispersion in an ultrasonic dispersing machine SILENTSONIC UL-6200 (available from Sharp Corporation; high-frequency output: 600 W, 40 kHz) for 60 minutes. After standing still for 12 hours, the dispersion was centrifuged using a centrifugal separator H-103N (available from KOKUSAN CORPORATION) at 7000 rpm for 90 minutes. The resulting supernatant was further centrifuged using an ultra-high speed centrifugal separator H-200nR (available from KOKUSAN CORPORATION) at 20000 rpm for 70 minutes. The adsorption of the resin was determined based on the concentration of the binder resin in the resulting supernatant.

<Error Rate>

After loading the cartridge housing a sample tape to an Ultrium 230 drive (available from Hewlett-Packard Development Company), the error rate of the sample magnetic recording tape was determined using a SCSI control software. A total of 8 Gbits of random data was recorded on the tape from a data area initiating point of the tape. In this procedure, a write bit error rate (W-bER) was defined as Log$_{10}$X, wherein X is obtained by dividing the number of correctable C1 errors extracted by the SCSI control software by 8 Gbits. The results are shown in Table 1 below. In Table 1, each value for W-bER is shown as a difference in error rate between each Example and Comparative Example 3. If the value is a plus number, its error rate is better than that of Comparative Example 3.

TABLE 1

| | Electron-beam-curable vinyl chloride resin | | | Nonmagnetic powder (needle α-Fe$_2$O$_3$) | | | Surface roughness | | Electro-magnetic | |
|---|---|---|---|---|---|---|---|---|---|---|
| | | Moisture content before modification (%) | Base resin | Compound for modification | Average major axis length (nm) | BET specific surface area (m$^2$/g) | Adsorption (mg/m$^2$) | Ra after application (nm) | Ra after calendering (nm) | conversion Signal amplitude | Error rate W-bER |
| | Resin Number | | | | | | | | | | |
| Ex. 1 | Resin 1 | 0.1 | MR110 | IPDI-HPA | 110 | 57 | 1.58 | 9.6 | 3.9 | 107% | +0.53 |
| Ex. 2 | Resin 2 | 0.2 | MR110 | IPDI-HPA | 110 | 57 | 1.35 | 10.0 | 3.8 | 110% | +0.70 |
| Ex. 3 | Resin 2 | 0.2 | MR110 | IPDI-HPA | 110 | 71 | 1.14 | 8.5 | 3.1 | 120% | +1.51 |
| Ex. 4 | Resin 3 | 0.1 | MR104 | IPDI-HPA | 110 | 57 | 1.58 | 10.2 | 3.9 | 108% | +0.61 |
| Ex. 5 | Resin 4 | 0.2 | MR104 | IPDI-HPA | 110 | 57 | 1.46 | 8.7 | 3.8 | 109% | +0.68 |
| Ex. 6 | Resin 4 | 0.2 | MR104 | IPDI-HPA | 110 | 71 | 1.23 | 9.2 | 3.1 | 117% | +1.28 |
| Ex. 7 | Resin 7 | 0 | MR110 | IEM | 110 | 71 | 1.88 | 10.5 | 4.1 | 106% | +0.38 |
| Com. Ex. 1 | Resin 5 | 0 | MR110 | IPDI-HPA | 110 | 57 | 2.35 | 12.3 | 5.4 | 101% | +0.05 |
| Com. Ex. 2 | Resin 6 | 0.05 | MR110 | IPDI-HPA | 110 | 57 | 2.25 | 11.9 | 5.2 | 102% | +0.10 |
| Com. Ex. 3 | Resin 7 | 0 | MR110 | IEM | 110 | 57 | 2.50 | 13.0 | 5.9 | 100% | ±0.00 |
| Com. Ex. 4 | Thermosetting binder resin MR 112 | | | | 110 | 57 | 1.88 | 15.0 | 7.0 | 90% | −0.60 |

<BET Specific Surface Area>

The BET specific surface area of a sample resin with respect to the non-magnetic powder was determined in terms of gas adsorption measured according to the BET method using a full-automatic specific surface area measuring instrument Multisorb 12 (available from Yuasa Ionics Inc.).

The above-mentioned adsorption of resin is per 1 g of the hematite particles. The adsorption (mg) per square meter (m$^2$) of BET specific surface area is determined by dividing the measured adsorption of resin by the measured specific surface area.

<Surface Roughness (Center-Line-Average Height Ra)>

The center-line-average height Ra of a sample magnetic recording tape was determined using a Taly Step System available from Talor Hobson Ltd. with a cutoff (filter) of 0.18 to 9 Hz at a tracer pressure of 2 mg, measuring speed of 0.03 mm/sec and measuring length of 500 μm.

<Electromagnetic Conversion Properties>

The signal amplitude of a sample magnetic recording tape integrated into the cartridge was determined as the electromagnetic conversion properties using a Small Format Tape Evaluation System for LTO (LTO SFTES) available from Measurement Analysis Corporation. In this procedure, the cartridge housing the sample tape was loaded to a head mounted with a LTO Ultrium 2 drive.

Table 1 shows that magnetic recording medium each containing, in a non-magnetic layer, an electron-beam-curable resin having an adsorption with respect to a non-magnetic powder of less than 2.2 mg/m$^2$ as in Examples 1 to 7 have a more smooth surface and exhibit more satisfactory electromagnetic conversion properties and a reduced error rate than the magnetic recording medium of Comparative Examples 1 to 3, in which the adsorption is 2.2 mg/m$^2$ or more.

The moisture content before modification, the type of the base resin before modification, the type of the adduct and the gel fraction of each of the electron-beam-curable vinyl chloride resins are shown in Table 2 below. Table 2 indicates that a non-magnetic layer having a high gel fraction and being capable of crosslinking satisfactorily is obtained at moisture contents before modification of 0.1% to 2.0%. The gel fraction herein was determined in the following manner.

<Method for Determination of Gel Fraction>

A sample electron-beam-curable resin was adjusted to a solid content of 30%, was applied to a release film using an applicator, was dried at 90° C. for 5 minutes and thereby yielded a resin coating 25 μm thick. The resin coating was then cured by applying electron beams at a dose of 6.0 Mrad. The cured coating was peeled off from the release film and was cut into sheets about 1 cm wide and 4 cm long. The weight (A g) of the cut sheet was determined, and the sheet was subjected to reflux in MEK for 5 hours, was then dried at 60° C. for 24 hours, and the weight (B g) of the dried film was determined. The gel fraction of the electron-beam-curable resin was determined according to the following equation:

Gel fraction=$(B/A) \times 100$

TABLE 2

| | Electron-beam-curable vinyl chloride resin | | |
|---|---|---|---|
| | Moisture content before modification (%) | Base resin | Compound for modification | Gel fraction (%) |
| Resin 1 | 0.1 | MR110 | IPDI-HPA | 96 |
| Resin 2 | 0.2 | MR110 | IPDI-HPA | 97 |
| Resin 3 | 0.1 | MR104 | IPDI-HPA | 96 |
| Resin 4 | 0.2 | MR104 | IPDI-PA | 98 |
| Resin 5 | 0 | MR110 | IPDI-HPA | 91 |
| Resin 6 | 0.05 | MR110 | IPDI-HPA | 92 |
| Resin 7 | 0 | MR110 | IEM | 89 |

What is claimed is:

1. A magnetic recording medium comprising:
   a non-magnetic substrate;
   a non-magnetic layer being arranged on or above one side of the non-magnetic substrate and containing a non-magnetic powder, a carbon black and a binder resin; and
   a magnetic layer being arranged on or above the non-magnetic layer and containing a ferromagnetic powder and a binder resin,
   wherein the binder resin of the non-magnetic layer comprises an electron-beam-curable resin having an adsorption with respect to the non-magnetic powder of less than 2.2 mg per square meter in terms of a specific surface area determined according to a Brunauer-Emmett-Teller method.

2. The magnetic recording medium according to claim 1, wherein the electron-beam-curable resin is a vinyl chloride resin having at least one functional group sensitive to electron beams.

3. The magnetic recording medium according to claim 1, wherein the non-magnetic powder has a pH of 7 or below.

4. The magnetic recording medium according to claim 2, wherein the non-magnetic powder has a pH of 7 or below.

5. The magnetic recording medium according to claim 1, wherein the adsorption with respect to the non-magnetic powder is 1.9 mg per square meter or less in terms of a specific surface area determined according to a Brunauer-Emmett-Teller method.

6. The magnetic recording medium according to claim 1, wherein the adsorption with respect to the non-magnetic powder is 1.6 mg per square meter or less in terms of a specific surface area determined according to a Brunauer-Emmett-Teller method.

7. The magnetic recording medium according to claim 1, wherein the non-magnetic powder is selected from the group consisting of needle non-magnetic iron oxide, calcium carbonate, titanium dioxide, barium sulfate, α-alumina, and mixtures thereof.

8. The magnetic recording medium according to claim 1, wherein the electron-beam-curable resin occupies 50 percent by weight or more of a total binder resin in the non-magnetic layer.

9. The magnetic recording medium according to claim 1, wherein a weight ratio of the non-magnetic powder to the carbon black in the non-magnetic layer ranges from 90:10 to 10:90.

10. The magnetic recording medium according to claim 1, wherein a thickness of the non-magnetic layer ranges from 0.1 to 2.5 μm.

* * * * *